Aug. 4, 1953 F. E. KENTZ 2,647,761
TRAILER HITCH
Filed April 25, 1952 2 Sheets-Sheet 1

INVENTOR.
FRED E. KENTZ
BY
ATTORNEY

Aug. 4, 1953　　　F. E. KENTZ　　　2,647,761
TRAILER HITCH

Filed April 25, 1952　　　2 Sheets-Sheet 2

INVENTOR.
FRED E. KENTZ
BY
ATTORNEY

Patented Aug. 4, 1953

2,647,761

UNITED STATES PATENT OFFICE 2,647,761

TRAILER HITCH

Fred E. Kentz, Denver, Colo.

Application April 25, 1952, Serial No. 284,266

6 Claims. (Cl. 280—33.17)

This invention relates to hitches for the coupling of wheeled units in towed relation with automotive vehicles, and more particularly to a hitch especially adapted for the coupling of conventional trailer units, such as house trailers, to and for towing by conventional passenger automobiles of the type equipped with rearwardly and upwardly opening trunks, or storage compartments, at the rear of their body structures, and has as an object to provide an improved, operatively-efficient trailer hitch susceptible of convenient and rapid connection or detachment relative to the towing vehicle through simple manipulations.

A further object of the invention is to provide an improved trailer hitch so engaging with the towing vehicle as to minimize adverse or undesirable influence of the tow on the inherent handling and roadability characteristics of the said vehicle.

A further object of the invention is to provide an improved trailer hitch accommodative without strain or distortion of all angular relationships and adjustments between the towed and towing units incident to travel of the so-coupled assembly.

A further object of the invention is to provide an improved trailer hitch that is automatically effective in use to encourage and maintain longitudinal coalignment of the coupled units during travel of the assembly.

A further object of the invention is to provide an improved trailer hitch operable to apply manipulations of the towing vehicle to and for direct, positive control, directional and other, of the towed unit in either forward or reverse travel of the assembly.

A further object of the invention is to provide an improved trailer hitch that is simple of production and installation, positive and efficient in use, adaptable to the coupling of a wide range of particular trailer types and constructions with the great majority of conventional automobiles, and conducive in use to road safety and security.

With the foregoing and other objects in view, my invention consists in the construction, arrangement, and combination of elements as hereinafter set forth, pointed out in my claims, and illustrated by the accompanying drawings, in which—

Figure 1:
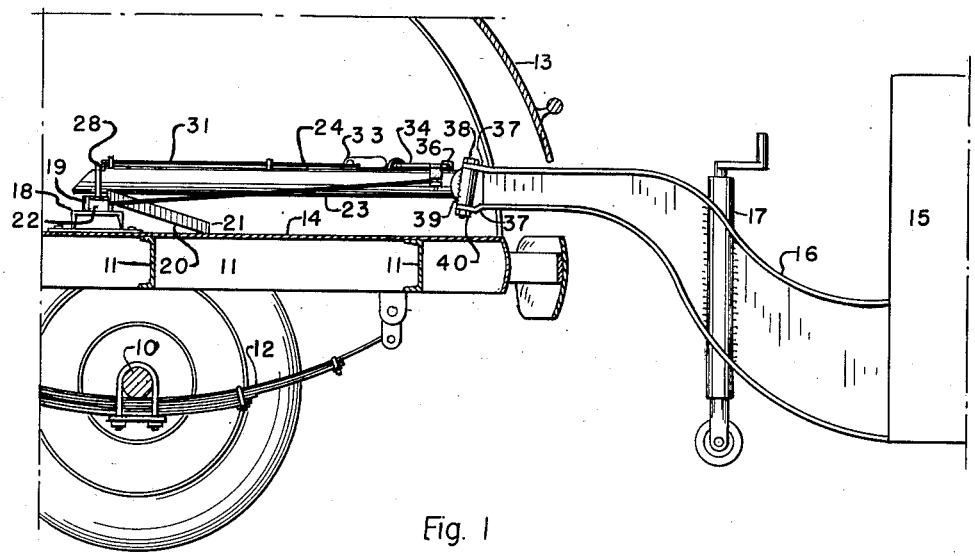
Figure 2:
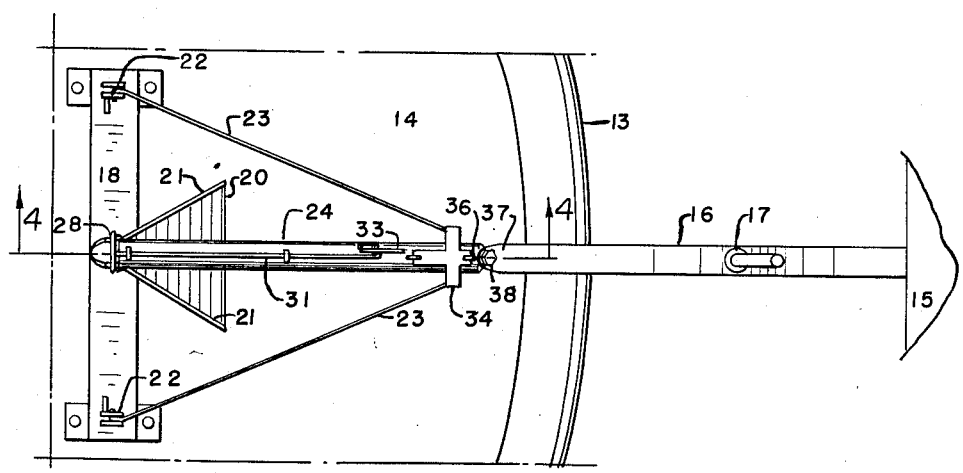
Figure 3:
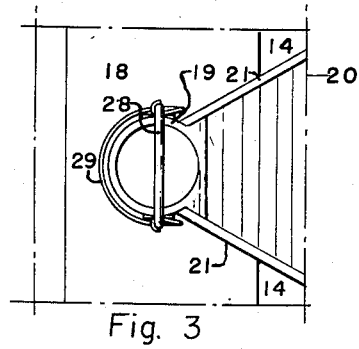
Figure 4:
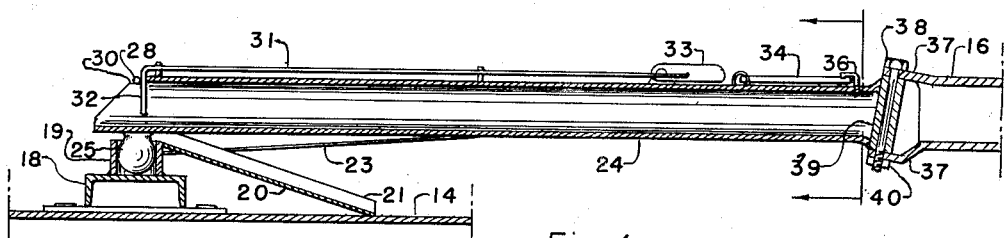
Figure 5:
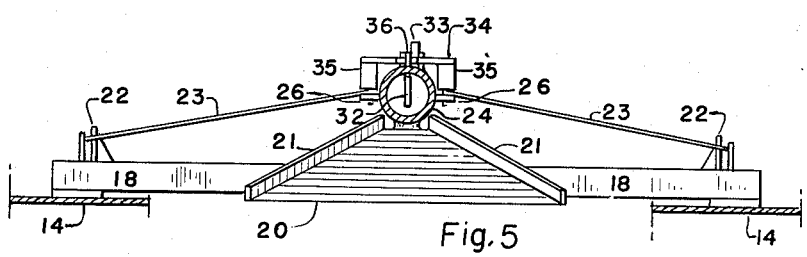
Figure 6:
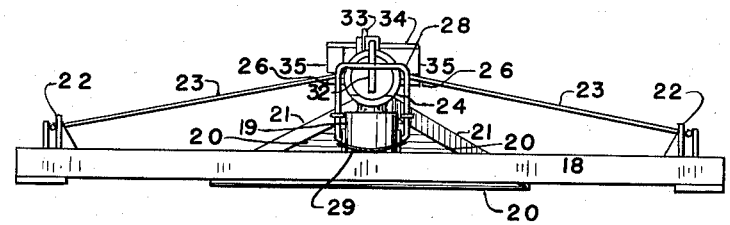
Figure 7:
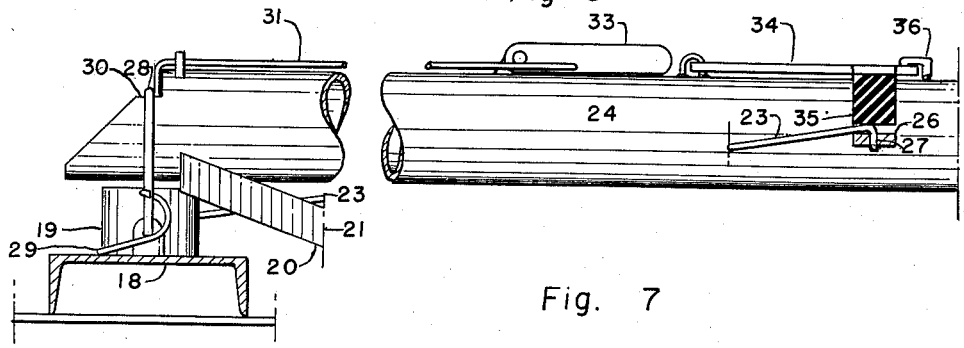

Figure 1 is a side elevation, somewhat diagrammatic and partially in section, of a typical embodiment of the invention as installed to intercouple an automobile and a trailer ready for travel, only those portions of the automobile and trailer requisite to an understanding of the invention being shown. Figure 2 is a top plan view of the hitch organization shown in Figure 1, detail of the automobile and trailer being omitted. Figure 3 is a fragmentary, detail, plan view, on a relatively enlarged scale, of the coupling element of the improved hitch affixed to the automobile, as said element appears when disconnected from the towing bar of the hitch. Figure 4 is a section, on a relatively enlarged scale, longitudinally of the towing bar taken substantially on the indicated line 4—4 of Figure 2. Figure 5 is a cross section taken substantially on the indicated line 5—5 of Figure 4. Figure 6 is a front end elevation of the hitch assembly as represented connected ready for use in Figures 1, 2, 4 and 5. Figure 7 is a fragmentary, detail, side elevation, on a further enlarged scale, of the towing bar and related elements as associated for use, portions of the elements shown being broken away to conserve space.

It is a well-established and wide-spread practice to associate wheeled units in towed relation with conventional automobiles for travel over roads and highways; the use of large house trailers as living quarters for travelers being a notable example. Since availability of the towing automobile for normal use apart from the trailer is an important consideration, the hitch employed to couple the automobile with the trailer should be readily connectible and detachable without the use of tools or the expenditure of much labor and time and without unsightly attachments remaining on the towing vehicle after the hitch has been uncoupled. Further, for security, safety, and efficient operations, the trailer should be related with the automobile in a manner to preserve the inherent handling and roadability characteristics of the latter, to accommodate angular adjustment of the trailer relative to the automobile in horizontal, vertical, and transverse planes of the assembly, and to promote longitudinal coalignment of the trailer and automobile during travel of the coupled assembly. Corrective of many of the shortcomings of hitches hitherto available, the instant invention provides a novel and practical hitch satisfying the noted requisites and employable to positively and securely intercouple towed and towing vehicles of many particular types and constructions.

In the drawings, a towing vehicle, or automobile, of the general type wherewith the improved hitch is adapted to be used is represented by the showing of a wheel-supported axle 10, a rigid frame 11 mounted in a generally-horizontal plane above and for travel with said axle by means of springs 12, a trunk or compartment, typified by the cover 13, above and opening upwardly and rearwardly relative to the rearward end of said frame, and a trunk or compartment floor 14 fixed to the frame upper surface. Representative of any type and construction of wheeled unit suitable to function as a trailer in towed relation with an automotive vehicle, the forward end of a rigid body organization is designated by the numeral 15 and is shown as equipped with a rigidly-associated tongue member 16 extending, as is conventional practice, a relatively short distance forwardly from and on the longitudinal median line of the body 15, the said member 16 being illustrated as of box construction affixed at one end to a lower, front portion of the body 15 and curving thence as a gooseneck upwardly and forwardly for disposition of its forward end above the level of the trunk or compartment floor 14 when the said body 15 is in a normal attitude characterized by horizontal disposition of the body floor. Further exemplifying conventional practice, the member 16 operatively mounts a jack 17 vertically extensible and retractible into and out of engagement of its lower end with the ground, thus to stabilize and level the trailer unit when detached from the towing vehicle and to provide means for altitudinally adjusting the free end of the tongue member 16 in connection with and to facilitate coupling operations.

Featuring the invention, a towing bar in hinged relation with and forward extension from the free end of the member 16 is arranged for pivotal connection with a point transversely central of the frame 11 above and preferably forwardly of the axle 10, thus to apply the loads imposed by the coupled trailer to the towing vehicle in a manner to preserve the inherent balance and handling and road-ability characteristics of the latter. The means carried by the towing vehicle for connection with the towing bar are installed within the trunk or compartment of the vehicle in a permanent, as distinguished from a detachable, association therewith which but little obstructs said trunk or compartment, and comprise a rigid beam 18, conveniently an inverted channel member, engaged against the upper surface of the trunk or compartment floor 14 and securely attached to said floor, or to the frame 11, or to both, to laterally traverse the trunk or compartment just forwardly of and parallel to the axle 10, an upwardly-opening, cylindrical socket 19 fixed to and upstanding vertically from said beam on the longitudinal median line of the vehicle, and a slide ramp 20 characterized by forwardly-convergent, upstanding side flanges 21 fixed to incline upwardly and forwardly of the vehicle from a wider rear margin against the floor 14 to a forward margin approximating in width the bore of the socket 19 and engaging the rearward arc of said socket at the upper end thereof. Adjacent the ends of the beam 18 in a uniform spacing from the socket 19, ears 22 fixedly rise from the beam as hinge connections for the forward ends of tension links 23 thereby engaged to swing through vertical arcs about axes elevated above the beam 18 in appropriate correlation with the depth of the socket 19.

The towing bar of the improved hitch is a straight, rigid, conveniently-tubular member 24 of a length slightly less than the distance longitudinally of the vehicle from the socket 19 to the rearward margin of the trunk or compartment floor 14. At the forward end of the bar 24 is integrally formed or affixed, as by means of welding, a ball 25 positioned with a diameter radially of the bar to project laterally from one side of the bar in a size receivable within and to substantially fill the socket 19, and inwardly adjacent the other end of said bar apertured lugs 26 fixedly outstand diametrically of and oppositely from the bar in a plane perpendicular to the bar radius coincident with the ball 25 diameter, thus to dispose said lugs transversely of the vehicle trunk or compartment and parallel to the floor 14 thereof when the ball 25 is engaged within the socket 19 and hence in position to be engaged by rearward end hooks 27 of the links 23, whereby to align the so-mounted bar longitudinally of the vehicle and to inhibit swinging of said bar laterally of the vehicle about the pivotal ball-and-socket joint at the bar forward end. The ball 25 pivotally mounting the forward end of the bar 24 is retained against separation from the socket 19 by means of a clip 28 formed as a yoke and hinged at its separated leg ends to opposite sides and adjacent the base of the socket 19 to swing through a vertical arc longitudinally of the vehicle with its closed end paralleling the length of the beam 18 and well above the socket 19 upper end when the clip is vertical; a spring 29 engaged with the legs of the clip 28 being arranged to yieldably urge the clip rearwardly of the vehicle about its hinge mounting and into normal, bridging relation of its closed end across and above the socket open end. The end of the bar 24 carrying the ball 25 extends slightly beyond the ball and is beveled away from the ball position to form a nose leading to a notch or shoulder 30 chordally of the bar side remote from the ball and parallel to the plane common to the lugs 26, which notch or shoulder has a depth radially of the bar and a disposition longitudinally thereof appropriate to locate it for reception within the yoke of the vertically-positioned clip 28 when the ball 25 is seated in the socket 19, thus to inhibit adventitious separation of said ball and socket. The latching coaction of the clip 28 and notch or shoulder 30 is an automatic corollary to engagement of the ball 25 within the socket 19, since when the detached bar 24 is moved forwardly and longitudinally of the vehicle, with the ball 25 sliding along the floor 14 and thence up the slide ramp 20 to the open end of the socket 19, the nose of said bar engages the closed end of the clip 28 and swings the clip against the pressure of the spring 29 forwardly and into uncovering relation with the socket end to permit the ball to drop into the socket, whereafter the spring 29 returns said clip over the now-lowered nose of the bar and into latching engagement with the notch or shoulder 30. Facilitating detachment of the bar 24 from its connection with the beam 18, a slide rod 31 reciprocable longitudinally of the bar through guides fixed to the bar side opposite that carrying the ball 25 is formed with a right-angular terminal finger 32 disposed radially and inwardly of the bar across the chordal plane of the notch or shoulder 30 and hence in position to engage behind the closed end of the clip 28 when seated in said notch or shoulder and to swing the clip forwardly against the pressure of the spring 29 and out of said notch or shoulder when the rod 31 is shifted in its mounting guides forwardly along the bar 24. Near the rearward end of the bar 24 and forwardly from the lugs 26, a lever 33 is hinged at one end to said bar for actuation through a vertical arc in substantial alignment with the rod 31, and the rearward end of said rod hingedly engages with said lever at a point offset to one side of the line longitudinally of the lever which passes through the lever hinge axis, thus to latch and hold the lever against the bar 24 when in rod-retracting position. Manifestly, when the lever 33 is swung forwardly to extend the rod 31, the clip 28 is unseated from the notch or shoulder 30 and held in substantial clearing relation with the nose of the bar 24, in which relation of elements the bar forward end may be lifted to clear the ball 25 from the socket 19 and to consequently eliminate the connection between said bar and the towing vehicle, all without occasion for awkward and inconvenient manual operations deep within the vehicle trunk or compartment. Engagement of the hooks 27 of the links 23 with the lugs 26 is operatively secured, silenced, and made convenient of detachment by means of a clamp plate 34 hinge-linked at its forward end to the same side of the bar 24 as mounts the lever 33, said plate being engaged with the bar forwardly from the lugs 26 and extending rearwardly along the bar past the position of said lugs. Lateral and opposite extensions of the plate 34 are provided to overhang the lugs 26 and a block 35 of yieldable material, such as rubber, is affixed to and extends below the underside of each of said extensions in position to bear against the hook angle of the link 23 end engaged with the corresponding lug, the blocks 35 being sized to compress in engagement with the link hooks when the free end of the plate 34 approaches the bar 24 and holds the link hooks against separation from the lugs and against rattling; an eye in the free end of the plate 34 adapted for manual engagement and disengagement with the hooked end of a stud 36 threadedly and rotatably associated with the rearwardly-adjacent area of the bar 24 serving to retain the clamp plate 34 in securing relation with the link 23 ends, when desired, and to facilitate release of said plate for detachment of said links from the lugs 26 as a phase of hitch detachment.

Intercoupling of the tongue member 16 and towing bar 24 is had through the agency of a hinge permissive of articulation therebetween in a generally-horizontal plane, a feature of the invention being an inclination of the intercoupling hinge axis such as favors and promotes longitudinal coalignment of the towing bar and tongue member during travel of the coupled assembly. In any appropriate particular construction, the free end of the tongue member 16 is worked or formed as a fork 37 of considerable depth in the vertical plane and arranged to open forwardly of the tongue member, the arms limiting the depth of said fork being apertured to accommodate a hinge pin 38 engageable therein with its axis in the vertical plane longitudinally bisecting the tongue member 16 and at an angle to the vertical on the order of seven degrees effective to advance the lower end of said pin outwardly of the tongue member beyond the position of the pin upper end. Cooperable with the fork 37, a knuckle 39 is formed on the end of the towing bar 24 remote from the ball 25 in an angular relation to the axis of said bar appropriate for reception of the pin 38 when said knuckle is embraced within the fork and said pin is entered through the apertures of the fork arms and the bore of the knuckle to complete a hinge connection, retaining means, such as a nut 40, on the lower end of the pin 38 functioning to inhibit accidental displacement of the pin. With the hinge construction shown and described, the towing bar 24 and tongue member 16 are intercoupled for relative articulation in the generally horizontal plane about an axis slightly inclined to the vertical and are held against any material relative articulation in the vertical plane, the inclination of the coupling hinge axis operating to urge the tongue member into maintained alignment with the towing bar during towing operations, since any deviation of said tongue member from such alignment tends to elevate the hinge joint for the development of a gravity force component conducive to realignment of the hinge-coupled members.

In the use of the improved hitch, a towing vehicle is equipped with a beam 18 and its appurtenances, including the socket 19, ramp 20, and links 23, and the towing bar 24 is coupled to the tongue member 16 by means of the hinge pin 38, said bar normally being folded back along the tongue member when the trailer unit is disconnected from the towing vehicle. To connect the hitch for towing of the trailer unit, the towing bar is swung on the hinge pin 38 to align with and extend forwardly from the tongue member, the jack 17 is operated to elevate the free end of the towing bar above the level of the trunk or compartment floor 14 and, with said trunk or compartment open, the towing vehicle is backed toward the trailer unit to enter the said bar within the trunk or compartment. As the vehicle is backed, the ball 25 engages with and slides forwardly on the ramp 20, whereby it is guided to the open end of the socket 19, until it registers with the socket 19 and is received therein, the nose of the towing bar swinging the clip 28 forwardly to uncover the socket until the ball has dropped to its seat therein, whereafter said clip is returned by the spring 29 over the nose of the towing bar and to engagement within the notch 30 where it functions to hold the ball 25 against escape from the socket. With the ball 25 engaged in the socket 19, the plate 34 is freed from its latch stud 36 and swung to uncover the lugs 26, the hooks 27 of the links 23 are caught in said lugs, and the said plate 34 is returned to bring its blocks 35 to bear against the angles of said hooks, in which position the stud 36 is reengaged with and to latch said plate. With the hitch so connected, the jack 17 is retracted and the assembly is ready for travel, the ball-and-socket joint between the head of the towing bar 24 and the beam 18 accommodating angular adjustments in the vertical plane and rolling adjustments in a transverse plane between the vehicle and its tow while the hinge represented by the pin 38 accommodates angular adjustments therebetween in the horizontal plane in the manner and with the unique advantage above discussed.

When it is desired to uncouple the trailer unit from the towing vehicle, the improved hitch is of material convenience and advantage. The plate 34 is first unlatched and moved to uncover the hooks 27 and said hooks are then disengaged from the lugs 26. Thereafter, the lever 33 is swung forwardly about its pivot to extend the rod 31 along the bar 24 and to move, through the agency of the rod terminal finger 32, the clip 28 into clearing relation with the towing bar nose and the jack 17 is actuated to elevate the tongue member 16 and attached towing bar 24 until the ball 25 is lifted clear of its socket seat, in which relation of the elements the towing vehicle may be driven forwardly until the said bar 24 is fully withdrawn from the trunk or compartment. It is to be noted that all of the coupling and uncoupling operations characterizing the improved hitch may be quickly and easily accomplished without recourse to tools and without occasion for a manipulator assuming any unusual or uncomfortable position.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A trailer hitch comprising a trailer-fixed tongue member, a towing bar, a beam adapted to be secured to and transversely of a towing vehicle, a socket fixed to and opening upwardly from a midportion of said beam, a ball fixedly outstanding laterally from one end of said towing bar for removable and replaceable coaction with said socket, links hinged to and adjacent the ends of said beam detachably engageable in convergent relation with the end of said towing bar remote from said ball, whereby to detachably associate said towing bar in maintained perpendicular relation with said beam for limited oscillation of its free end through an arc in a plane perpendicular to that of the beam and for limited angular play in the plane perpendicular to that of its oscillation, and a hinge characterized by an axis of articulation inclined in the longitudinal vertical plane of said tongue member intercoupling the free end of the latter and the end of the towing bar remote from said beam with the hinge axis lower end advanced relative to its upper end.

2. In a trailer hitch, a trailer-fixed tongue member, a towing bar, a hinge intercoupling said tongue member and towing bar for relative articulation in a generally horizontal plane, a beam adapted to be secured to and transversely of a towing vehicle, a socket fixed to and opening upwardly from a midportion of said beam, a ball fixedly outstanding laterally from the unhinged end of said towing bar for coaction with said socket, selectively-releasable means for retaining said ball in engagement with said socket, links hinged to and adjacent the ends of said beam detachably engageable in convergent relation with the end of the towing bar remote from said ball, selectively-manipulable means for securing said links in engaged relation with the towing bar, and means associated with said socket to guide the towing bar ball thereinto.

3. The organization according to claim 2, wherein the hinge intercoupling the tongue member and towing bar is characterized by an axis inclined in the longitudinal vertical plane of the tongue member to advance its lower end away from the tongue member relative to its upper end, whereby to induce coalignment of the tongue member and towing bar during towing operations.

4. The organization according to claim 2, wherein the selectively-releasable means for retaining the ball of the towing bar in engagement with the beam socket comprises a clip hinged to yoke over and to swing relative to said socket, a spring yieldably maintaining said clip in bridging relation over and across said socket, a bevelled nose on said towing bar terminating in a shoulder coactable with said clip when the ball is seated in the socket, a slide rod carried by and reciprocable longitudinally of the towing bar, a terminal finger on said slide rod disposed to bear against said clip, and a lever hingedly interconnecting said slide rod and towing bar manipulable to extend and retract said rod relative to said bar.

5. The organization according to claim 2, wherein the selectively-manipulable means for securing the links in engaged relation with the towing bar comprises apertured lugs fixedly outstanding laterally and oppositely from the towing bar adjacent the end thereof remote from the ball, hooks on the ends of the links remote from the beam adapted to engage through the apertures of said lugs, a plate hinged at one end to the upper surface of the towing bar and formed with lateral extensions disposed to overlie said lugs, blocks of resilient material carried by and beneath said plate extensions for engagement against said lugs and the link hooks entered therein, and a hooked stud on and manipulable relative to the towing bar for latching engagement with the otherwise free end of said plate.

6. The organization according to claim 2, wherein the means for guiding the towing bar ball into the beam socket comprises a slide ramp inclined upwardly and forwardly beneath the towing bar position to close at its forward margin against the rearward arc of the socket upper end and forwardly-convergent flanges rising above and defining the sides of said ramp.

FRED E. KENTZ.

References Cited in the file of this patent

UNITED STATES PATENTS

| Number | Name | Date |
|---|---|---|
| 2,163,999 | Jacks | June 27, 1939 |
| 2,212,081 | Spires | Aug. 20, 1940 |
| 2,393,016 | Black | Jan. 15, 1946 |